Oct. 9, 1962 B. H. VAN HORNE ET AL 3,057,185

PHOTOELECTRIC TREND DETECTOR

Filed Feb. 6, 1961

INVENTORS.
Beverley H. Van Horne
Manson Keith Detwiler

BY C. Kenneth Bjork
AGENT

United States Patent Office 3,057,185
Patented Oct. 9, 1962

3,057,185
PHOTOELECTRIC TREND DETECTOR
Beverley H. Van Horne and Manson Keith Detwiler, Midland, Mich., assignors to The Dow Chemical Company, Midland, Mich., a corporation of Delaware
Filed Feb. 6, 1961, Ser. No. 87,427
6 Claims. (Cl. 73—37)

This invention relates to a trend detector and more particularly to a photoelectric means and method of detecting deviations in the slope of a straight line.

This invention is a useful improvement or addition to conventional indicating or controlling line recorders or similar type instruments. It finds particular utility as a means of controlling applied pressures in the method for nondestructive hydrostatic testing of pressure vessels disclosed in a copending application Serial No. 59,748, filed September 30, 1960.

It is a principal object of the present invention to provide a means of detecting a change in the trend or slope of a recorder line by photoelectric means.

It is another object of the present invention to provide a means of controlling a process or system, wherein operating conditions are depicted by a curve, i.e., line, drawn by a recorder or similar instrument, utilizing photoelectric detection of a change in the slope of the line to activate a cutoff switch and/or alarm or other system control means.

It is a further object of the present invention to provide a means of automatically controlling and terminating pressure vessel tests conducted using a nondestructive hydrostatic method of testing disclosed in a copending application, Serial No. 59,748, filed September 30, 1960.

These and other objects and advantages will be apparent from reading the detailed description presented hereinafter in conjunction with the accompanying drawings.

In carrying out the method of the instant invention, a photoelectric cell with a suitable cooperating light source is fixedly attached to a pen or other curve producing means of a recorder utilized to indicate reaction or operating conditions in a given system. The trend detector, sometimes referred to hereinafter as trend indicator, is so positioned that the cell senses a given amount of light projected onto the recorder chart as a relatively straight line is being projected. However, if the slope of this line changes, correspondingly there is a change in light output which is noted by the cell. This in turn is reflected as a change in electrical output of the cell which is transmitted to suitable process or reaction controls thereby activating these.

Figure 1:
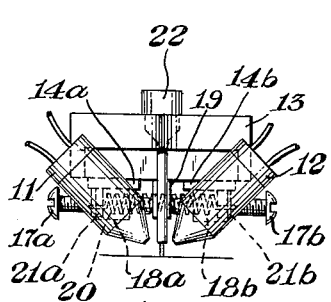
FIGURE 1 is a front elevation of one embodiment of a trend detector useful in the present method.
Figure 2:
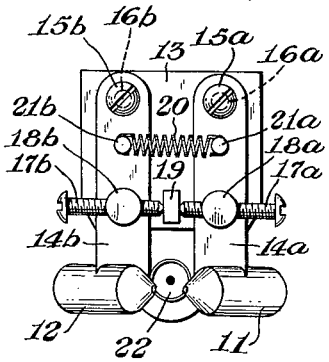
FIGURE 2 is a bottom view of the trend detector shown in FIGURE 1.
Figure 3:
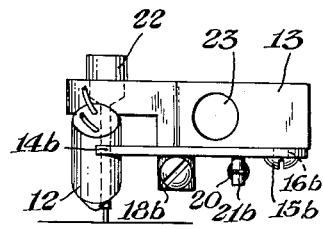
FIGURE 3 is a side view of the trend detector shown in FIGURE 1.

In one particular trend indicator embodiment shown in FIGURES 1-3 a photoelectric cell 11 and a cooperating light source 12 are attached to a common mounting block 13 by means of bars 14a—14b respectively. The cell 11 and light source 12 are attached each one end of a bar and the bars in turn are attached to the mounting block 13 by means of screws 15a—15b passing through openings 16a—16b in the bars 14a—14b respectively near the end opposite that to which is affixed the cell 11 and light source 12. When attached to the mounting block 13, the photoelectric cell 11 and light source 12 are in a cooperative angular mirror image relationship so that when the light beam projected from the light source strikes a plane surface it is reflected back to the photoelectric cell 11. The so-mounted cell 11 and light source 12 assemblies each have a lateral adjusting screw 17a—17b respectively which pass through threaded screw holders 18a—18b affixed on the bars 14a—14b respectively at about the midpoint and which can strike a common barrier 19 affixed to the block 14 between the bars 14a—14b. Additionally, the bars 14a—14b are kept under tension by a spring 20 attached to both bars by means of spring holders 21a—21b mounted on the bars 14a—14b near the openings 16a—16b respectively. A recording stylus or pen 22 also is held by the mounting block 13. The point of this pen projects below the mounting block to the plane struck by the projected beam of light, i.e. the spot or circle of light at the apex of the angle formed by the projected intersection of the center axis of the light source and photocell. Also, the pen point is adjacent to the photoelectric cell 11 and light source 12. The body mounting 13 defines an opening 23 passing crosswise therethrough by which the trend detector can be mounted on a given recorder.

In operation with a conventional line recorder, the photoelectric cell 11 is oriented with respect to the light source 12 so that it picks up the projected light beam which is reflected from the recorder chart. The light source 12 is so positioned with respect to the pen that the projected beam of light strikes the chart behind the pen and a slight distance away from the edge of the line or curve.

Figure 4:
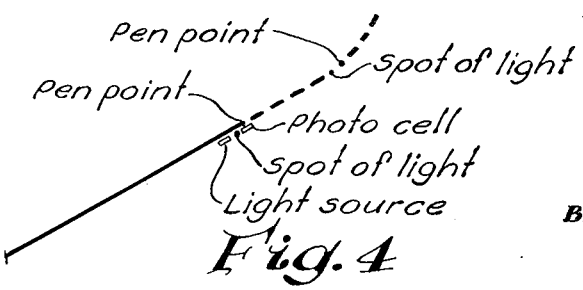
FIGURE 4 shows schematically a photoelectric trend detector positioned with respect to a recording pen and a given constant slope line produced by this recorder as used in the present method.

Thus in normal operation, i.e., with a constant slope line, the photocell 11 does not "see" the line, as is shown in FIGURE 4, but rather measures the amount of light reflected by the chart itself and transmits this as corresponding electrical signals. As the operation proceeds, the photoelectric cell and light source and correspondingly the light beam follow the line and are parallel to it as long as the curve maintains its constant slope. However, any increase in the trend or slope of the line, as shown by the projection of the curve of FIGURE 4, permits the cell to "see" the line record. Upon "seeing" the line, the amount of transmitted light and correspondingly output of the photoelectric cell are changed. This change in output of the cell in turn is utilized to activate suitable control, cutoff, alarm or other process system operational devices.

In the present method, the sensitivity of the trend indicator shown in FIGURES 1-3 can be controlled by adjusting the distance between the spot projection of the beam of light on the chart and the edge of the line produced by the recorder. This is very easily carried out by manipulating the lateral adjusting screw assembly for the cell and light source. Thus, for high precision work the beam can be made to almost touch the edge of the line. On the other hand, for work requiring less precision and which can tolerate small deviations in the process control, as depicted by small deviations in the slope of the recorded line, the light projection can be moved farther away from the edge of the line.

In other embodiments wherein the departure from the normal or expected operating conditions may result in a decrease in the slope of the line recorder, the cell and light source are placed on the side of the line opposite from that shown in FIGURE 4.

Additionally, if desired the light beam can be centered on the line behind the pen and the photoelectric cell be adjusted to read the light transmitted therefrom. As the slope of the line changes in this instance the increase in light transmitted read by the cell is utilized to activate the process control.

Any of a wide variety of photoelectric cells and light sources can be utilized in the instant apparatus. Likewise these can be mounted in a variety of positions to accomplish the desired effects produced by use of the instant method. However, for ease of installation on a given recorder, maneuverability and compactness a small size photoelectric cell such as a Clairex type CL3 and a miniature pre-focused electric light such as a No. 2 bright lamp (Welch-Allyn Inc.) which produces a small point of light on the recording chart have been found to be highly satisfactory for use in the embodiment of the trend detector shown in FIGURES 1-3.

The utility and operability of the instant device and method is further illustrated when used in conjunction with the method for nondestructive testing of pressure vessels.

Figure 5:
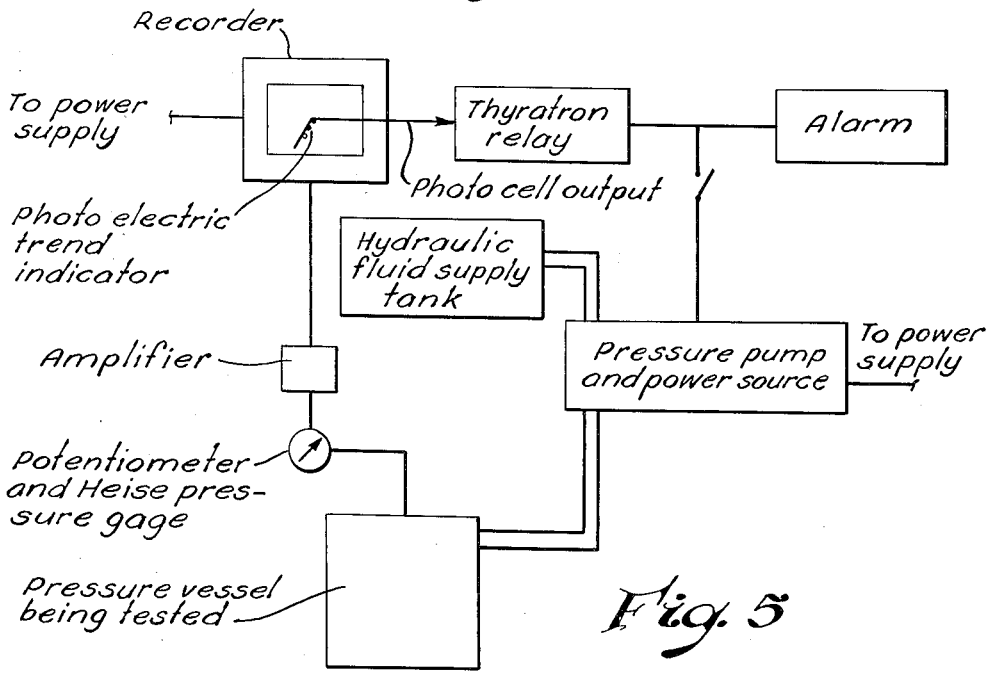
FIGURE 5 shows schematically the use of the trend detector shown in FIGURES 1-3 as a means of activating a pressure pump cutoff and signal alarm in a nondestructive hydrostatic method for testing the pressure vessels.

In this particular application, a test assembly as shown schematically in FIGURE 5 can be used to carry out the method. With a constant volume pressurizing pump, the rate of volume change ($\Delta V$) of a fluid filled vessel undergoing test with respect to increasing applied test pressure ($\Delta P$) i.e. $\Delta V/\Delta P$, is linear for a test vessel expanding within its elastic limits. This relationship therefore is recorded as a straight line as the impulses from the pressure detecting gage affixed to the vessel undergoing test are translated into electrical signals and subsequently into a line by a conventional line recorder.

However, in this method of testing, as the yield point of the vessel is reached, the slope of the line changes. Continuing the test beyond this point will yield a curve of increased slope indicating that the elastic limit of the vessel has been exceeded and that the vessel now is undergoing plastic deformation and permanent damage. At present, a somewhat noticeable deflection in the curve may be produced before human perception can denote that the elastic limit of the vessel has been exceeded. By incorporating the instant improved control means in the system, substantially instantaneous observation of the trend of the slope of the line is marked.

As the trend detector "sees" the line, the change in the output of the cell is transmitted to a suitable control mechanism such as a relay, switch and/or alarm whereby the pressure pump is stopped, the operator notified the elastic limit of the vessel has been reached and the test itself thereby halted before any vessel damage occurs.

Additionally the present control means also can be used with the nondestructive hydrostatic method of vessel testing wherein it is desired to stop the test at a predetermined pressure before the elastic limit of a given vessel is reached.

In this application, a line is drawn on the recording chart which line is so positioned to indicate a predetermined pressure being applied to a given vessel. The actual placement of the line on the chart can be determined by testing a given vessel or a prototype of a group of similar vessels to obtain the $\Delta V/\Delta P$ line for these vessels.

As drawn on the chart, the line is placed so that it is crossed by the curve produced by the line recorder during a vessel test. Correspondingly this predetermined and fixed pressure line also is "seen" by the trend indicator even though the test vessel curve still is a straight line. As indicated hereinbefore upon seeing a line a change occurs in the output of the photoelectric cell of the indicator which change can be used to activate test control and cutoff devices.

This particular application of vessel testing and test control is particularly useful wherein a number of vessels of the same type are to be tested for a given operating pressure below the the elastic limit of these vessels.

In addition, by means of this trend indicator method pecularities or deviations from normal operation of the pressurizing system which become evident to the recorder such as pump leakage, the pushing out of dimples and indentations in a given test vessel during the test and the like also would be sensed and indicated by the trend detector.

The following example will serve to illustrate further the method of the instant invention but is not meant to limit it thereto.

*Example*

A testing assembly was prepared as shown schematically in FIGURE 5. This assembly utilized a positive displacement piston-type constant delivery pump (Model H225 Steward Warner Corp.). The pump was connected to a fluid supply source (water) which in turn was coupled to a 5 gallon aluminum drum to be pressure tested. A Heise Gage with microtorque potentiometer also was attached to the keg. The potentiometer, in turn, was coupled through an amplifier to a Varian (0–10 mv.) recorder.

A photoelectric trend detector similar to that shown in FIGURES 1-3 was positioned with respect to the pen of the recorder to "see" the line as any increase in the slope of the $\Delta V/\Delta P$ line occurred during the vessel test. Lead wires from the photocell of the indicator were attached to a Thyratron amplifier and relay through which a change in the electrical output of the photoelectric cell was fed simultaneously to an alarm and to a shutoff switch for the pressurizing pump.

In carrying out the test, the aluminum test vessel was first filled with water. It was then coupled to the pressure pump through the fluid supply source and pressurizing was started. The rise in pressure of the vessel per unit time, as plotted by the recorder, was found to be linear up to an indicated pressure of 295 pounds per square inch gage. As this value was exceeded, the alarm sounded and the cutoff switch to the pressurizing pump was activated thereby stopping the test. Careful examination of the curve produced by the Varian recorder indicated a slight increase in the slope of the line at this point.

The pressure was released on the test vessel and a second run was made wherein the trend detector was disconnected from the circuit. In this control test pressurizing of the vessel was continued above and beyond 295 pounds per square inch. It was found in this second test that the line produced by the recorder underwent a continual increase in slope above this point thereby indicating that at pressures greater than 295 pounds per square inch the test vessel was undergoing plastic deformation and permanent damage.

Various modifications can be made in the improved means and method of the instant invention without departing from the spirit or scope thereof for it is understood that we limit ourselves only as defined in the appended claims.

We claim:

1. In a method for the nondestructive, hydrostatic testing of pressure vessels wherein continually increasing pressure applied to the interior of a fluid-filled pressure vessel is detected by a pressure detector, the pressure transmitted to a pressure analyzer and recorded on a line recorder, and wherein the line plotted by said recorder is of constant slope while said vessel is within its elastic limit and said slope changes as said elastic limit is reached, the improvement which comprises; (1) attaching a photoelectric trend detector to said recorder, said detector comprising a light source and a photoelectric cell and said detector indicating a given amount of light as said recorder is projecting a straight line but said detector denoting a change in light output when the slope of said line deviates from its original constant slope, (2) following the constant slope line produced by said recorder with said detector, (3) denoting the change in slope of said line with said detector as the slope of said line deviates from its constant value by a change in electrical output of said photoelectric cell and (4) transmitting the electrical output from said photoelectric cell to a process control apparatus whereby the change in electrical output of said photoelectric cell as said detector indicates a change in slope of said line is utilized to stop said pressure test.

2. The improvement in nondestructive testing of pressure vessels as defined in claim 1 wherein the electrical output from the photoelectric cell is transmitted to a relay connected to a pressurizing pump cutoff switch and an alarm system.

3. The improvement in nondestructive testing of pressure vessels as defined in claim 1 wherein the trend detector is fixedly attached to the recording pen and wherein the light beam projected from the light source strikes the chart of recorder behind said pen and a slight distance away from the edge of the line produced by said pen while said slope of the line being produced by the pen during vessel testing is constant and wherein said light beam touches said line when the slope of said line deviates from its original constant slope.

4. In a method for the nondestructive, hydrostatic testing of pressure vessels wherein continually increasing pressure applied to the interior of a fluid-filled pressure vessel is detected by a pressure detector, the pressure transmitted to a pressure analyzer and recorded on a line recorder and wherein the curve plotted by said recorder is of constant slope while said vessel is within its elastic limit and said slope changes as said elastic limit is reached, the improvement which comprises; (1) attaching a photoelectric trend detector to said recorder, said detector comprising a light source and a photoelectric cell, said detector being fixedly attached to the recording pen of said recorder so that the light beam projected from the light source strikes the chart of recorder behind said pen and a slight distance away from the edge of the curve produced by said pen while said slope of the curve being produced by the pen during vessel testing is constant, said detector indicating a given amount of light as said recorder is projecting a straight curve, (2) positioning a line on the chart of said recorder so that the curve produced by said recorder and said trend detector crosses said line, said line indicating a predetermined pressure below the elastic limit of said vessel, (3) denoting the crossing of said line by said detector by a change in light output and correspondingly the electrical output of said photoelectric cell and (4) transmitting the electrical output from said photoelectric cell to a process control apparatus whereby the change in electrical output of said photoelectric cell as said detector crosses said line is utilized to stop said pressure test.

5. A photoelectric trend indicating device which comprises a photoelectric cell and a cooperating light source each rigidly affixed to one end of separate mounting bars, each of said bars defining an opening near the opposite end, each of said bars being attached to a common mounting block by a screw passing through said opening, each of said screws mating with a thread assembly in said mounting block, said photoelectric cell and said light source when so attached to said mounting block being in a mirror image angular relationship so that the light beam projected by said light source upon striking a plane surface is reflected to said photoelectric cell, said photoelectric cell being adjustable by a lateral adjusting screw, said screw passing through a threaded screw holder about at the midpoint of said bar affixed to said cell, the end of said screw projecting through said screw holder striking a barrier affixed to said mounting block midway between said bars, said light source having a similar lateral adjusting screw, the end of said screw of said light source also striking said barrier on the side opposite that struck by said adjusting screw of said photocell, a spring connecting said bars, said spring being held by a spring holder mounted on each of said bars near the openings therein, said body member defining a pen holder, said pen holder positioning a pen so that the point of said pen projects below said mounting block to the plane struck by the projected light beam from said light source and adjacent to said light beam.

6. The photoelectric trend indicating device as defined in claim 4 wherein the light source is a miniature prefocused electric bulb which projects a small circle of light.

No references cited.